United States Patent
Srivatsan et al.

(10) Patent No.: US 11,138,089 B2
(45) Date of Patent: Oct. 5, 2021

(54) PERFORMANCE BENCHMARK GENERATION

(71) Applicant: International Business Machines Corporation, Armonk, NY (US)

(72) Inventors: Shricharan Srivatsan, Austin, TX (US); Vivek Britto, Austin, TX (US); Aishwarya Dhandapani, Folsom, CA (US); Tharunachalam Pindicura, Austin, TX (US); John A. Schumann, Austin, TX (US); Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 16/225,287

(22) Filed: Dec. 19, 2018

(65) Prior Publication Data

US 2020/0201739 A1 Jun. 25, 2020

(51) Int. Cl.
*G06F 11/34* (2006.01)

(52) U.S. Cl.
CPC ...... *G06F 11/3428* (2013.01); *G06F 11/3476* (2013.01)

(58) Field of Classification Search
CPC .. G06F 30/33; G06F 2115/10; G06F 30/3312; G06F 11/3428; G06F 11/3476
See application file for complete search history.

(56) References Cited

U.S. PATENT DOCUMENTS

| | | | |
|---|---|---|---|
| 5,841,967 A * | 11/1998 | Sample | G06F 30/331 714/33 |
| 7,788,625 B1 * | 8/2010 | Donlin | G06F 30/30 716/109 |
| 8,065,128 B1 | 11/2011 | Chase | |
| 8,468,327 B2 | 6/2013 | Takao | |
| 8,898,096 B2 | 11/2014 | Caves et al. | |
| 9,772,917 B2 | 9/2017 | Jeong et al. | |
| 9,928,150 B2 | 3/2018 | Lin et al. | |
| 9,940,222 B2 | 4/2018 | Li et al. | |

(Continued)

OTHER PUBLICATIONS

Psarakis, M. et al., "Microprocessor Software-Based Self-Testing," IEEE Design & Test of Computers, vol. 27, No. 3, 2010.

(Continued)

*Primary Examiner* — Elias Desta
(74) *Attorney, Agent, or Firm* — Scully, Scott, Murphy & Presser, P.C.

(57) ABSTRACT

A method, computer program product, and a computer system are disclosed for processing information in a processor that in one or more embodiments includes generating workload information of a performance base test; determining characteristics of the workload information; determining one or more constraints that can cause behavioral changes to a design of the processor; combining the determined characteristics and the determined one or more constraints to generate one or more example constraints; testing the one or more example constraints in one or more example performance tests; and generating one or more performance benchmarks for the performance base test and the one or more example performance tests.

20 Claims, 3 Drawing Sheets

(56) References Cited

U.S. PATENT DOCUMENTS

2005/0081170 A1\* 4/2005 Hyduke ................ G06F 30/331
716/114
2011/0087861 A1 4/2011 Bertacco et al.
2015/0286573 A1 10/2015 Socarras et al.

OTHER PUBLICATIONS

Gagarina, L.G. et al., "An Approach to Automatic Test Generation for Verification of Microprocessor Cores," 2018 IEEE Conference of Young Researchers in Electrical and Electronic Engineering (ElConRus), 2018.

\* cited by examiner

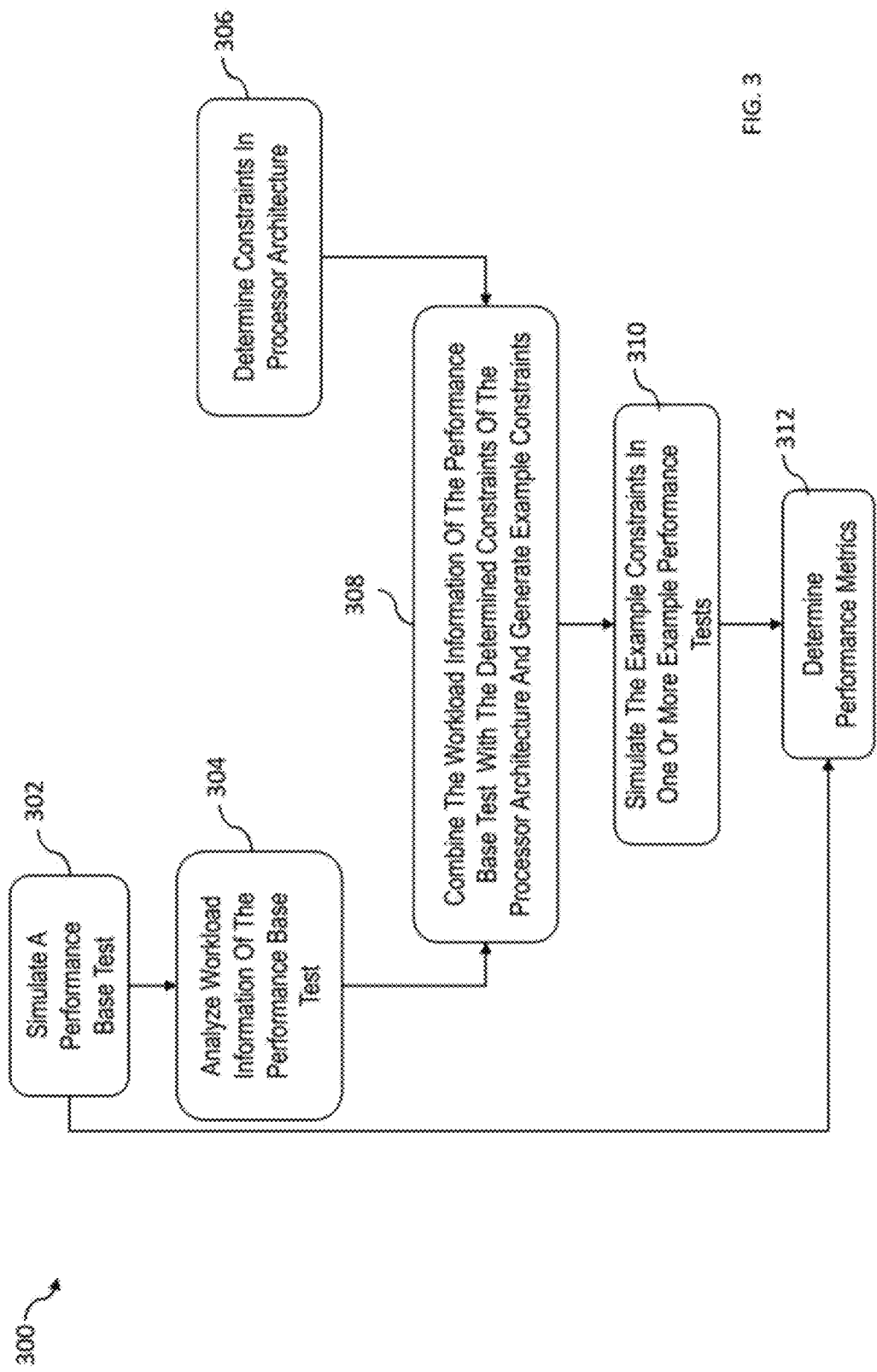

PERFORMANCE BENCHMARK GENERATION

BACKGROUND

This disclosure herein relates generally to processors, and more particularly, to methods, apparatus, and products for automated generation of performance benchmarks with randomized data and instruction addresses.

Typically, to verify the performance of a processor, design verification engineers may run directed tests and workloads on the processor. However, running directed tests and workloads may not be encompassing enough to discover a majority or all of the design issues in the processor. For instance, the tests and workloads may not detect issues related to cache line alignment, page alignment strides, address aliasing, and/or cache and translation replacement algorithms. Moreover, software of the processor that is compiled without explicit directives may not always follow alignment specifications. By not detecting processor design issues during testing, the hardware of the processor may include acute software bugs that may not be found until the processor operates in a live environment. Design verification engineers may attempt to detect these design issues by manually writing streaming tests that include different instruction addresses and offsets; however, this process is tedious and does not provide a large enough scope to detect a majority of the design issues in the processor.

SUMMARY

The summary of the disclosure is given to aid understanding of a computer system, computer architectural structure, processor, and method of generating performance benchmarks with randomized data and instruction addresses to detect design issues in a processor, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, and their method of operation to achieve different effects.

In one or more embodiments, a method of verifying the performance of a design of a processor is disclosed that includes generating workload information of a performance base test. The method in an embodiment includes determining characteristics of the workload information. In one or more aspects, the method includes determining one or more constraints that can cause behavioral changes to the design of the processor. In one or more embodiments, the method further includes combining the determined characteristics and the determined one or more constraints to generate one or more example constraints. In one or more embodiments, the method includes testing the one or more example constraints in one or more example performance tests. The method includes in one or more aspects generating one or more performance benchmarks for the performance base test and the one or more example performance tests.

In one or more embodiments, a computer program product for verifying the performance of a design of a processor includes a non-transitory computer-readable storage medium having program instructions embodied therewith. The program instructions in an embodiment are executable by one or more processors. In one or more embodiments, the program instructions include generating workload information of a performance base test. In one or more aspects, the program instructions include determining characteristics of the workload information. The program instructions in an embodiment further include determining one or more constraints that can cause behavioral changes to the design of the processor. In one or more embodiments, the program instructions include combining the determined characteristics and the determined one or more constraints to generate one or more example constraints. The program instructions in an aspect further include testing the one or more example constraints in one or more example performance tests. In one or more embodiments, the program instructions include generating one or more performance benchmarks for the performance base test and the one or more example performance tests.

In one or more embodiments, a system is disclosed for verifying the performance of a design of a processor. In one or more aspects, the system includes memory having program instructions embodied therewith, and at least one processor configured to read the program instructions. In one or more embodiments, the at least one processor is configured to read the program instructions to execute a simulator configured to generate workload information of a performance base test. The at least one processor in an embodiment is configured to read the program instructions to execute a test analyzer configured to determine characteristics of the workload information. In one or more embodiments, the at least one processor is configured to read the program instructions to execute a constraint generator configured to determine one or more constraints that can cause behavioral changes to the design of the processor. The at least one processor in an aspect also is configured to read the program instructions to execute a test bench configured to combine the determined characteristics and the determined one or more constraints to generate one or more example constraints, test the one or more example constraints in one or more example performance tests, and generate one or more performance benchmarks for the performance base test and the one or more example performance tests.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features and embodiments of a computer system, computer architectural structure, processor, and their method of operation will be better understood when read in conjunction with the figures provided. Embodiments are provided in the figures for the purpose of illustrating aspects, features, and/or various embodiments of the computer system, computer architectural structure, processors, and their method of operation, but the claims should not be limited to the precise arrangement, structures, features, aspects, assemblies, systems, embodiments, or devices shown, and the arrangements, structures, subassemblies, features, aspects, methods, processes, embodiments, and devices shown may be used singularly or in combination with other arrangements, structures, assemblies, subassemblies, systems, features, aspects, embodiments, methods and devices.

FIG. 3 is a flowchart illustrating a method of verifying performance for a processor design, according to one or more embodiments of the present disclosure.

DETAILED DESCRIPTION

The following description is made for illustrating the general principles of the invention and is not meant to limit the inventive concepts claimed herein. In the following detailed description, numerous details are set forth in order to provide an understanding of the computer system, computer architectural structure, processor, and their method of operation, however, it will be understood by those skilled in the art that different and numerous embodiments of the computer system, computer architectural structure, processor, and their method of operation may be practiced without those specific details, and the claims and disclosure should not be limited to the embodiments, subassemblies, features, processes, methods, aspects, features, and/or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following discussion omits or only briefly describes conventional features of information handling systems, including processors and microprocessor systems and architectures, which are apparent to those skilled in the art. It is assumed that those skilled in the art are familiar with the general architecture of processors, and in particular, with processor design verification. It may be noted that a numbered element is numbered according to the figure in which the element is introduced, and is typically referred to by that number throughout succeeding figures.

Exemplary methods, apparatus, and products for automated generation of performance micro-benchmarks with randomized data and instruction addresses in accordance with the present disclosure are described further below with reference to the Figures.

Figure 1:
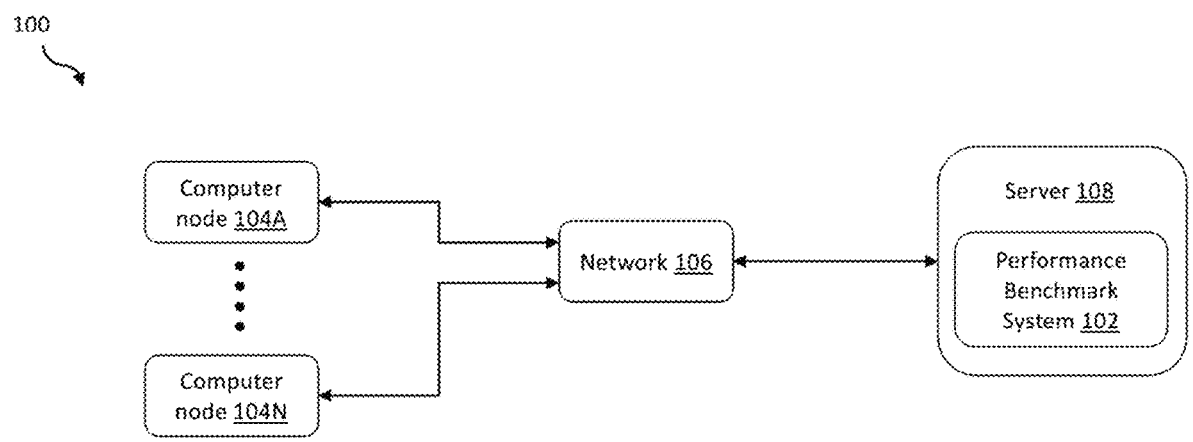
FIG. 1 is a functional block diagram illustrating a data processing environment, according to one or more embodiments of the present disclosure.

FIG. 1 is a functional block diagram illustrating a data processing environment 100, in accordance with one or more embodiments of the present disclosure. FIG. 1 provides only an illustration of one implementation and does not imply any limitations with regard to the environments in which different embodiments may be implemented. Many modifications to the depicted environment may be made by those skilled in the art without departing from the scope of the embodiments herein. Data processing environment 100 includes network 106, server 108, which operates the performance benchmark system 102, and one or more computer nodes, such as computer node 104A and computer node 104N.

Network 106 can be, for example, a local area network (LAN), a telecommunications network, a wide area network (WAN), such as the Internet, a virtual local area network (VLAN), or any combination that can include wired, wireless, or fiber optic connections. Network 106 can also include wire cables, wireless communication links, fiber optic cables, routers, switches and/or firewalls. Network 106 interconnects server 108, computer node 104A, and computer node 104N. In general, network 106 can be any combination of connections and protocols capable of supporting communications between server 108, computer node 104A, computer node 104N, and performance benchmark system 102.

Server 108 can be a web-based server hosting performance benchmark system 102, in accordance with embodiments of the disclosure. In one or more embodiments, server 108 can be a web server, a blade server, a computer including one or more processors and at least one non-transitory computer readable memory, a mobile computing device, a laptop computer, a tablet computer, a netbook computer, a personal computer (PC), a desktop computer, or any programmable electronic device or computing system capable of receiving and sending data, via network 106, and performing computer-readable program instructions. In other embodiments, server 108 can be a data center, consisting of a collection of networks and servers providing an IT service, such as virtual servers and applications deployed on virtual servers, to an external party. In yet other embodiments, server 108 represents a computing system utilizing clustered computers and components (e.g., database server computer, application server computers, etc.) that act as a single pool of seamless resources, such as in a cloud computing environment, when accessed within data processing environment 100.

In some embodiments, server 108 includes a data storage repository (not shown) for storing data including, but not limited to, performance base tests, workload information of the performance base tests, processor architecture and/or designs, example constraints, example performance tests, and performance benchmark outputs of the performance base tests and example performance tests. Data storage repository can be one of, a web server, a mobile computing device, a laptop computer, a tablet computer, a netbook computer, a personal computer (PC), a desktop computer, or any programmable electronic device or computing system capable of receiving, storing, and sending files and data, and performing computer readable program instructions capable of communicating with server 108, computer node 104A, and computer node 104N, via network 106. In other embodiments, data storage repository can represent virtual instances operating on a computing system utilizing clustered computers and components (e.g., database server computer, application server computers, etc.) that act as a single pool of seamless resources when accessed within data processing environment 100.

In some embodiments, performance benchmark system 102 operates on a central server, such as server 108, and can be utilized by one or more computer nodes, such as computer node 104A and computer node 104N, via a mobile application downloaded from the central server or a third-party application store. In another embodiment, performance benchmark system 102 may be a software-based program, downloaded from a central server, such as server 108, and installed on one or more computer nodes, such as computer node 104A and computer node 104N. In yet another embodiment, performance benchmark system 102 can be utilized as a software service provided by a third-party cloud service provider (not shown).

In some embodiments, computer node 104A and computer node 104N are clients to server 108 and can be, for example, a desktop computer, a laptop computer, a tablet computer, a personal digital assistant (PDA), a smart phone, a thin client, or any other electronic device or computing system capable of communicating with server 108 through network 106. For example, computer node 104A and computer node 104N may be a desktop computer capable of connecting to a network, such as network 106, to access one or more components of the performance benchmark system 102. In other embodiments, computer node 104A and computer node 104N can be any suitable types of mobile devices capable of running mobile applications, including smart phones, tablets, slate, or any type of device that runs a mobile operating system. In yet other embodiments, computer node 104A and computer node 104N can represent virtual instances operating on a computing system utilizing clustered computers and components (e.g., database server computer, application server computers, etc.) that act as a single pool of seamless resources when accessed within data processing environment 100. In yet another embodiment, computer node 104A and computer node 104N can include a user interface (not shown) for providing an end user with the capability to interact with performance benchmark system 102.

In some embodiments, computer node 104A and 104N are capable of communicating with each other, with server 108, and with other computer nodes in a distributed cluster through network 106. In some embodiments, the computer nodes and server 108 can function as one or more clusters in a distributed system, via network 106, to operate performance benchmark system 102. In some embodiments, components of performance benchmark system 102 reside locally on server 108. In other embodiments, components of performance benchmark system 102, either individually or in various combinations, reside remotely from each other on server 108 and one or more computer nodes, such as computer node 104A and 104N, of the distributed clusters, in which the components are connected via network 106. In an embodiment, network 106 connects the one or more computer nodes of the distributed clusters.

Figure 2:
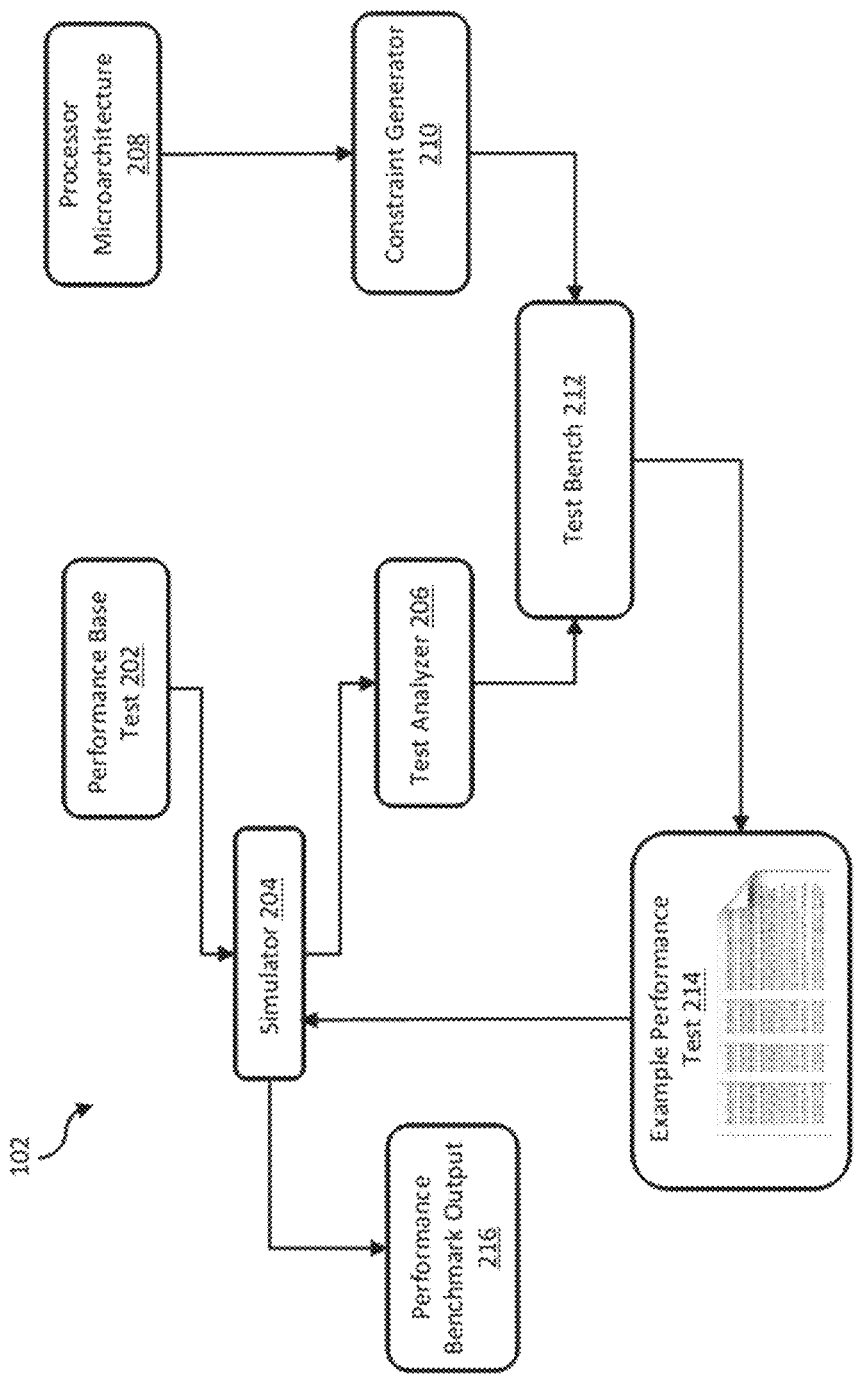
FIG. 2 is a functional block diagram illustrating components of a performance benchmark system, according to one or more embodiments of the present disclosure.

FIG. 2 is a functional block diagram illustrating components of a performance benchmark system 102, according to one or more embodiments of the present disclosure. In some embodiments, performance benchmark system 102 includes one or more components, such as a simulator 204, a test analyzer 206, a constraint generator 210, and a test bench 212.

In one or more embodiments, the simulator 204 is configured to receive a performance base test 202. The performance base test 202 can be a test for any type of workload. For example, the performance base test 202 can be a memcopy test, or other types of high performance loops, such as a daxpy test or a dgemm test. The memcopy test may be, for example, represented as follows:

Loop:
  Load R3, R4
  Store R3, R9
  Add R4, R4, R8
  Add R9, R9, R10
  Branch Loop In a typical memcopy test, a processor may load information into a register of the processor, store the information in a different memory location of the processor, and increment the address pointer in order to repeat the load and store instructions. For example, the processor may load 64 bits of data in the location of memory pointed by the address in register R4 into register R3 of the processor; store the 64 bits in the register R3 to another location of memory pointed by the address in register R9; and increment, i.e., add, the address in the registers, such as register R4 and register R9 by the value in the register R8 and R10, to another address in memory. After incrementing the addresses, the memcopy test loops to the beginning of the memcopy test to load another 64 bits of data into the register and store the next 64 bits into the other location in memory. The register may be included in the processor. The memory can be internal memory and/or cache memory in the processor and/or memory external of the processor. In one or more embodiments, the simulator 204 can be a VHDL simulator or a software simulator. The VHDL simulator may simulate the microarchitecture of the processor to give accurate performance metrics of the workload. The software simulator may simulate instruction set architecture and may not be specific to the microarchitecture of the processor. The software simulator may provide workload information of the processor.

In one or more embodiments, the simulator 204 runs the performance base test 202 to generate workload information of the performance base test 202. The workload information may include information such as a number and/or types of streams, the stride and/or access pattern, and/or the registers used for the base address and increment. The simulator 204 provides the generated workload information to the test analyzer 206. For example, for the cases in which test analyzer 206 analyzes the workload information generated by the memcopy test, the generated workload information may include at least one of (a) the number and/or type of streams, (b) the stride and/or access pattern, and (c) the registers used for the base address and increment. The number and/or type of streams of the workload information may indicate, for example, that the memcopy test has two streams, in which one stream is a load stream and the other stream is a store stream. The stride and/or access pattern of the workload information may indicate, for example, that the memcopy test increments or strides the address by 16 Bytes. The registers used by the workload information may indicate, for example, that register R4 and register R9 are used for addressing data, and that register R8 and register R10 are used for incrementing addresses. It should be noted that the generated workload information may vary based on the type of performance base test run by the simulator 204. In one or more embodiments, the performance metrics of the performance base test 202 are generated at the same time as generating the workload information.

In one or more embodiments, the test analyzer 206 data mines the workload information to determine the characteristics of the workload information of the performance base test 202. For example, analyzing the workload information of the memcopy test, the test analyzer 206 determines how many streams of memory the processor has access to. The test analyzer 206 may determine that the workload information includes two streams, in which one stream loads data into one or more registers and the second stream copies the data into the one or more registers. In another example, the test analyzer 206 determines that the memcopy test for example strides by 32 bytes, i.e., one stream loads 16 bytes of data and copies it to another location, and then the address is incremented by 32 bytes which results in loading the data at address+32 and storing it in another location, effectively skipping 16 bytes of data in memory.

In one or more embodiments, the constraint generator 210 receives processor architecture 208 of the processor that is being tested. The processor architecture 208 may include the design aspects of the processor, e.g., the size of the registers, the logic states of the processor, the cache sizes of the processor, the cache line, or other design aspects of the processor known to one of ordinary skill in the art. In one or more embodiments, the processor architecture 208 is input into the constraint generator 210. In some aspects, a user may input the processor architecture 208 into the constraint generator 210.

In one or more embodiments, the constraint generator 210 mines the processor microarchitecture 208 to determine bits within the processor microarchitecture 208 that may cause behavioral changes to the design of the processor. That is, the constraint generator 210 data mines the processor microarchitecture 208 to determine bits that can cause changes in processor performance, such as by causing performance bottle necks impeding performance of the processor being tested or by causing performance increases. For example, bits of the processor that may create behavioral changes in the processor design may include at least one of (1) address alias bits (e.g., forwarding alias bits, directory hashing bits, bank conflicts, etc.), (2) alignment bits (e.g., cache congruency class, page alignment, etc.), and (3) bits to determine sub-macros (e.g., L2 bank, DDR channels, etc.). The constrain generator 210 may determine and/or list the bits that may cause behavioral changes in the design of the processor and/or processor performance problems. For example, the constraint generator 210 lists address alignment bits to determine whether the data is aligned in the data cache. In another example, the constraint generator 210 lists the bits to determine sub-macros, e.g., L2 bank or DDR channels, to determine which information goes to which DDR channel.

In one or more embodiments, the test bench 212 combines the data mined by the test analyzer 206 with the data mined by the constrain generator 210 to form example constraints. For example, the test bench 212 may combine the work load information mined from the memcopy test with the bits data mined from the processor architecture 208 to form the example constraints. For example, the test analyzer 206 may determine that R8 and R10 are used in the memcopy code to determine the address increment or stride, R4 and R9 are used to determine the address of the data load and stored. Based on the microarchitecture of the processor, the performance benchmark system 102 determines that using the same bits in the bit range 45:53 results in the two addresses aligning to the same L2 congruency class. Moreover, by using different bits, the performance benchmark system 102 determines that the bit position 54 of the address results in both addresses using different DDR channels. The information from the test analyzer is combined with the information from the microarchitecture to form the constraints. The example constraints may be, for example, (1) R8::{1, 2, 3, 4, 8 . . . } (Strides); (2) R10::{1, 2, 3, 4, 8 . . . } (Strides); (3) R4 [45:53]==R9 [45:53] (Same L2 congruency class); and (4) R4 [54]=0 && R9 [54]=1 (Targeting DDR Channels). The test bench may include versions of memcopy which uses one or more of these constraints.

The example constraints may represent actions taken in the processor that may decrease the performance of the processor. For example, by setting register 4 (R4) at bits 45 to 53 equal to register 9 (R9) at bits 45 to 53, an L2 congruency class conflict occurs, thereby resulting in a decrease in processor performance. Another constraint may include, for example, randomizing R4 at bits 45:53 and R9 at bits 45:53 to produce different cache alignments. In yet another example, by randomizing the bits R4 and randomizing the bits at R9, different odd or even DDR channels may be targeted. In one or more embodiments, the example constraints can be independent constraints in which each constraint is independently varied. In one or more embodiments, the example constraints may cause behavioral issues in the processor architecture 208 when the example constraints are simulated in an example performance test. In one or more embodiments, the example performance test includes the same instructions as the performance base test.

In one or more embodiments, the test bench 212 generates one or more example performance tests 214, e.g., example performance test #1 . . . test # N, to test the example constraints individually and in various combinations thereof. In one or more embodiments, the test bench 212 uses the same test for the example performance test 214 as used in the performance base test 202. In some embodiments, each of the example constraints may be individually tested in the example performance test 214. For example, the test bench 212 may individually test example constraint (1) using a memcopy test. In other embodiments, various combinations of the example constraints may be tested in the example performance test 214. For example, the test bench 212 may test example constraints (1) and (3) using the memcopy test. The memcopy test may be, for example, represented as follows:

Loop:
    Load R3, R4
    Store R3, R9
    Add R4, R4, R8
    Add R9, R9, R10
    Branch Loop In some aspects, the example performance test 214 that is using the memcopy test operates in the same way as the performance base test 202, i.e., the base memcopy test; however, the subsequent memcopy tests uses values in the registers that are based on the example constraints that are being tested. For example, the second memcopy test may use the first constraint of using the same L2 congruency class by using the same bits 45:53 in registers R4 and R9, thereby creating a test, which may behave differently and may result in lower performance. Another example may include using two different constraints, in which one constraint that has the same bit 54 in both registers R4 and R9, which will cause both the load and the store to use the same DDR channel, and another constraint that has a stride of 16 for both the streams, but uses 16 in both R8 and R10, thereby creating a test with both constraints that may cause different behavior and may result in lower performance.

In one or more embodiments, the simulator 204 generates one or more performance benchmark outputs 216 from the performance base test 202. In one or more embodiments, the performance benchmark outputs 216 include performance metrics for at least one of debug bandwidth, cycles per instruction (CPI), flushes, and hit or miss rates in a cache of the processor. Examples for bandwidth could be 32 bytes per cycle which indicates the copy loop is accessing 32 bytes every cycle, example for hit rates can be 80% which indicates 80% of the cache accesses are hits. For example, a performance benchmark output 216 may indicate that the base memcopy test may perform 2 copy instructions per cycle. In some embodiments, the simulator 204 generates the performance benchmark outputs 216 from the performance base test 202 at the same time as generating the workload information of the performance base test 202. In other embodiments, the simulator 204 generates the performance benchmark outputs 216 at a time other than when the simulator 204 generates the workload information of the performance base test 202.

In one or more embodiments, the simulator 204 generates performance benchmark outputs 216 for each example performance test 214. The performance benchmark outputs 216 may provide performance metrics of the example performance test 214. In one or more embodiments, the performance benchmark outputs 216 include performance metrics for at least one of debug bandwidth, CPI, flushes, and hit or miss rates in a cache of the processor.

In one or more embodiments, the performance benchmark outputs 216 of the performance base test 202 are compared to the performance benchmark outputs 216 of each example performance test 214 to determine whether the behavior of the processor changed and/or whether the performance of the processor decreased. For example, the test bench 212 may generate twenty memcopy tests as example performance tests, in which 18 of the performance memcopy tests perform 2 copy instructions per cycle, however, 2 of the performance memcopy tests perform 1 copy instruction per cycle. The performance benchmark system 102 determines that the 2 performance memcopy tests have a lower performance rate than the base memcopy test. The performance benchmark system 102 may mark these 2 performance memcopy tests as corner cases, in which the behavior of the processor changes and/or the performance of the processor decreases. In one or more embodiments, the performance benchmark system 102 sends the corner cases to a user for review. To avoid the corner cases, a user may change the way instructions are compiled. To minimize the impact of performance of the processor, the user may also change the processor microarchitecture design. In one or more embodiments, the performance benchmark outputs 216 of the performance base test 202 are compared to the performance benchmark outputs 216 of each example performance test 214 using automatic scripts. In other embodiments, the performance benchmark outputs 216 of the performance base test 202 are compared to the performance benchmark outputs 216 of each example performance test 214 manually by a user, such as a verification engineer.

FIG. 3 is a flowchart illustrating a method of verifying performance for a processor design, according to one or more embodiments of the present disclosure. While the method 300 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 3, but the process may be integrated and/or one or more steps may be performed together, simultaneously, or the steps may be performed in the order disclosed or in an alternate order.

In one or more embodiments, a performance base test is simulated at 302, preferably by the simulator 204. In one or more embodiments, the simulator 204 is configured to receive a performance base test 202. The performance base test 202 can be a test for any type of workload. For example, the performance base test 202 can be a memcopy test as described above. In one or more embodiments, the simulator 204 runs the performance base test 202 to generate workload information of the performance base test 202. The simulator 204 provides the generated workload information to the test analyzer 206.

In response to simulating the performance base test, the workload information of the performance base test is analyzed at 304, preferably by the test analyzer 206. In one or more embodiments, the test analyzer 206 mines the workload information to determine the characteristics of the workload information of the performance base test 202. For example, for the cases in which test analyzer 206 analyzes the workload information generated by the memcopy test, the generated workload information may include at least one of (a) the number and/or type of streams, (b) the stride and/or access pattern, and (c) the address of one or more registers.

In one or more embodiments, one or more constraints of processor microarchitecture is determined at 306, in which the constraints are preferably determined by the constraint generator 210. In one or more embodiments, the constraint generator 210 receives processor microarchitecture 208 of the processor that is being tested. The processor microarchitecture 208 may include the design aspects of the processor, e.g., the size of the registers, the logic states of the processor, the cache sizes of the processor, the cache line, or other design aspects of the processor known to one of ordinary skill in the art. In one or more embodiments, the constraint generator 210 data mines the processor microarchitecture 208 to determine bits within the processor architecture 208 that may cause behavioral changes to the design of the processor. That is, the constraint generator 210 data mines the processor microarchitecture 208 to determine bits that can cause performance bottle necks and may impede performance of the processor being tested. For example, bits of the processor that may create behavioral changes in the processor design may include at least one of (1) address alias bits (e.g., forwarding alias bits, directory hashing bits, etc.), (2) alignment bits (e.g., cache congruency class, page alignment, etc.), and (3) bits to determine sub-macros (e.g., L2 bank, DDR channels, etc.). In one or more embodiments, the constraint generator 210 lists the bits that may cause behavioral changes as described above.

In response to determining the workload information and the constraints, the workload information of the performance base test is combined with the determined constraints of the processor architecture and example constraints are generated at 308, preferably by the test bench 212. In one or more embodiments, the test bench 212 combines the data mined by the test analyzer 206 with the data mined by the constrain generator 210 to form example constraints. For example, the test bench 212 may combine the work load information data mined from the memcopy test with the bits data mined from the processor architecture 208 to form the example constraints. The example constraints may be, for example, (1) R8::{1, 2, 3, 4, 8 . . . } (Strides); (2) R10::{1, 2, 3, 4, 8 . . . } (Strides); (3) R4 [45:53]==R9 [45:53] (Same L2 congruency class); and (4) R4 [54]=0 && R9 [54]=1 (Targeting DDR Channels). In one or more embodiments, the example performance test includes the same instructions as the performance base test.

In one or more embodiments, the test bench 212 generates one or more example performance tests 214, e.g., example performance test #1 . . . test # N, to test the example constraints individually and in various combinations thereof. In one or more embodiments, the test bench 212 uses the same test for the example performance test 214 as used in the performance base test 202. In some embodiments, each of the example constraints may be individually tested in the example performance test 214. For example, the test bench 212 may individually test example constraint (1) using a memcopy test. In other embodiments, various combinations of the example constraints may be tested in the example performance test 214.

In one or more embodiments, the example constraints are simulated in one or more example performance tests at 310, preferably by the simulator 204. In one or more embodiments, the performance metrics are determined at 312. In one or more embodiments, the simulator 204 generates one or more performance benchmark outputs 216 from the performance base test 202. In one or more embodiments, the performance benchmark outputs 216 include performance metrics for at least one of debug bandwidth, cycles per instruction (CPI), flushes, and hit or miss rates in a cache of the processor. In some embodiments, the simulator 204 generates the performance benchmark outputs 216 from the performance base test 202 at the same time as generating the workload information of the performance base test 202. In other embodiments, the simulator 204 generates the performance benchmark outputs 216 at a time other than when the simulator 204 generates the workload information of the performance base test 202. In one or more embodiments, the simulator 204 generates performance benchmark outputs 216 for each example performance test 214. The performance benchmark outputs 216 may provide performance metrics of the example performance test 214. In one or more embodiments, the performance benchmark outputs 216 include performance metrics for at least one of debug bandwidth, CPI, flushes, and hit or miss rates in a cache of the processor.

While the illustrative embodiments described above are preferably implemented in hardware, such as in units and circuitry of a processor, various aspects of the illustrative embodiments may be implemented in software as well. For example, it will be understood that each block of the flowchart illustrations in FIG. 3, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

In one or more embodiments, a method of verifying the performance of a processor includes generating workload information of a performance base test. The method in an embodiment includes determining characteristics of the workload information. The method further includes in an aspect determining one or more constraints that can cause behavioral changes to a design of the processor. In one or more embodiments, the method includes combining the determined characteristics and the determined one or more constraints to generate one or more example constraints. The method in one or more aspects includes testing the one or more example constraints in one or more example performance tests. The method also includes in one or more embodiments generating one or more performance benchmarks for the performance base test and the one or more example performance tests.

A computer program product for verifying the performance of a processor design includes in one or more aspects a non-transitory computer-readable storage medium having program instructions embodied therewith. The program instructions are executable by one or more processors, and in one or more embodiments, the program instructions include generating workload information of a performance base test. The program instructions also include determining characteristics of the workload information. In an aspect, the program instructions include determining one or more constraints that can cause behavioral changes to a design of the processor, and combining the determined characteristics and the determined one or more constraints to generate one or more example constraints. In one or more embodiments, the program instructions include testing the one or more example constraints in one or more example performance tests. The program instructions further include in an embodiment generating one or more performance benchmarks for the performance base test and the one or more example performance tests.

In one or more embodiments, a system for verifying the performance of a processor design memory is disclosed that has program instructions embodied therewith, and at least one processor configured to read the program instructions. The at least one processor is configured to read the program instructions to execute a simulator configured to generate workload information of a performance base test. In one or more embodiments, the at least one processor is configured to read the program instructions to execute a test analyzer configured to determine characteristics of the workload information. The at least one processor in an aspect is configured to read the program instructions to execute a constraint generator configured to determine one or more constraints that can cause behavioral changes to a design of the processor. In one or more embodiments, the at least one processor is configured to read the program instructions to execute a test bench configured to combine the determined characteristics and the determined one or more constraints to generate one or more example constraints, test the one or more example constraints in one or more example performance tests, and generate one or more performance benchmarks for the performance base test and the one or more example performance tests.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of verifying the performance of a design of a processor, the method comprising:
   generating workload information of a performance base test;
   determining characteristics of the workload information;
   determining one or more constraints that can cause behavioral changes to the design of the processor;
   combining the determined characteristics and the determined one or more constraints to generate one or more example constraints;
   testing the one or more example constraints in one or more example performance tests; and
   generating one or more performance benchmarks for the performance base test and the one or more example performance tests.

2. The method of claim 1, further comprising: determining whether the one or more performance benchmarks of the one or more example performance tests are less than the one or more performance benchmarks of the performance base test.

3. The method of claim 1, wherein determining the one or more constraints comprises determining bits within the design of the processor that can cause behavioral changes to the design.

4. The method of claim 3, wherein the bits comprise at least one of address alias bits, alignment bits, and bits to determine sub-macros.

5. The method of claim 3, wherein behavioral changes comprise an increase in processor performance or a decrease in processor performance.

6. The method of claim 1, wherein testing the one or more example constraints in the one or more example performance tests comprises testing one example constraint in one example performance test.

7. The method of claim 1, wherein testing the one or more example constraints in the one or more example performance tests comprises testing more than one example constraint in one example performance test.

8. A computer program product for verifying the performance of a design of a processor comprising:
   a non-transitory computer-readable storage medium having program instructions embodied therewith, the program instructions executable by one or more processors, the program instructions including:
      generating workload information of a performance base test;
      determining characteristics of the workload information;
      determining one or more constraints that can cause behavioral changes to the design of the processor;
      combining the determined characteristics and the determined one or more constraints to generate one or more example constraints;
      testing the one or more example constraints in one or more example performance tests; and
      generating one or more performance benchmarks for the performance base test and the one or more example performance tests.

9. The computer program product of claim 8, wherein the program instructions further include determining whether the one or more performance benchmarks of the one or more example performance tests are less than the one or more performance benchmarks of the performance base test.

10. The computer program product of claim 8, wherein determining the one or more constraints comprises determining bits within the design of the processor that can cause behavioral changes to the design.

11. The computer program product of claim 10, wherein the bits comprise at least one of address alias bits, alignment bits, and bits to determine sub-macros.

12. The computer program product of claim 10, wherein behavioral changes comprise an increase in processor performance or a decrease in processor performance.

13. The computer program product of claim 8, wherein testing the one or more example constraints in the one or more example performance tests comprises testing one example constraint in one example performance test.

14. The computer program product of claim 8, wherein testing the one or more example constraints in the one or more example performance tests comprises testing more than one example constraint in one example performance test.

15. A system for verifying the performance of a design of a processor, the information handling system comprising:
   memory having program instructions embodied therewith, and
   at least one processor configured to read the program instructions to execute:
      a simulator configured to generate workload information of a performance base test;

a test analyzer configured to determine characteristics of the workload information;

a constraint generator configured to determine one or more constraints that can cause behavioral changes to the design of the processor; and a test bench configured to combine the determined characteristics and the determined one or more constraints to generate one or more example constraints, test the one or more example constraints in one or more example performance tests, and generate one or more performance benchmarks for the performance base test and the one or more example performance tests.

16. The system of claim 15, wherein the at least one processor is further configured to determine whether the one or more performance benchmarks of the one or more example performance tests are less than the one or more performance benchmarks of the performance base test.

17. The system of claim 15, wherein the constraint generator is further configured to determine bits within the design of the processor that can cause behavioral changes to the design.

18. The system of claim 17, wherein the bits comprise at least one of address alias bits, alignment bits, and bits to determine sub-macros.

19. The system of claim 15, wherein the test bench is further configured to test one example constraint in one example performance test.

20. The system of claim 15, wherein the test bench is further configured to test more than one example constraint in one example performance test.

* * * * *